United States Patent

[11] 3,619,318

[72] Inventor Richard S. Shultz
 Wheaton, Ill.
[21] Appl. No. 853,370
[22] Filed Aug. 27, 1969
[45] Patented Nov. 9, 1971
[73] Assignee Container Corporation of America
 Chicago, Ill.

[54] METHOD AND APPARATUS FOR PREPARING SCORING DIES
 4 Claims, 13 Drawing Figs.
[52] U.S. Cl. .................................................. 156/215,
 156/257, 156/443
[51] Int. Cl. ...................................................... B29d 24/00
[50] Field of Search .......................................... 156/215,
 257, 443; 85/50 R

[56] References Cited
 UNITED STATES PATENTS
 2,598,460  5/1952  Stevens .......................... 85/50 R X
 3,113,898  12/1963  Tross ............................. 156/215

Primary Examiner—Benjamin A. Borchelt
Assistant Examiner—G. E. Montone
Attorney—Carpenter, Ostis and Lindberg ABSTRACT: A male-female member and a female scoring element cooperate with a uniform size scoring rule to locate the female scoring element on a scoring cylinder. The male-female member is removed and replaced by a second male-female member having a bead or land entering the groove of the female scoring element. The width of the groove of the female scoring element is chosen in accordance with the caliper of paperboard being scored, and the land enters the groove of the female scoring element to an extent placing a proper score in the board. The distance between the cylinder supporting the female scoring element and the rule chase and the dimensions of the male-female member and the female scoring element are so chosen that the paperboard fits nicely between the male-female member and female scoring element, which are in confronting relationship, so that deformation of the paperboard takes place only at the score being formed.

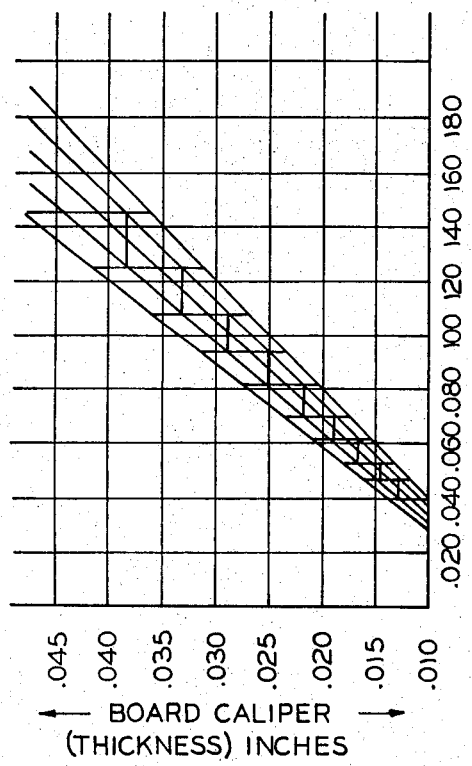
FIG.3
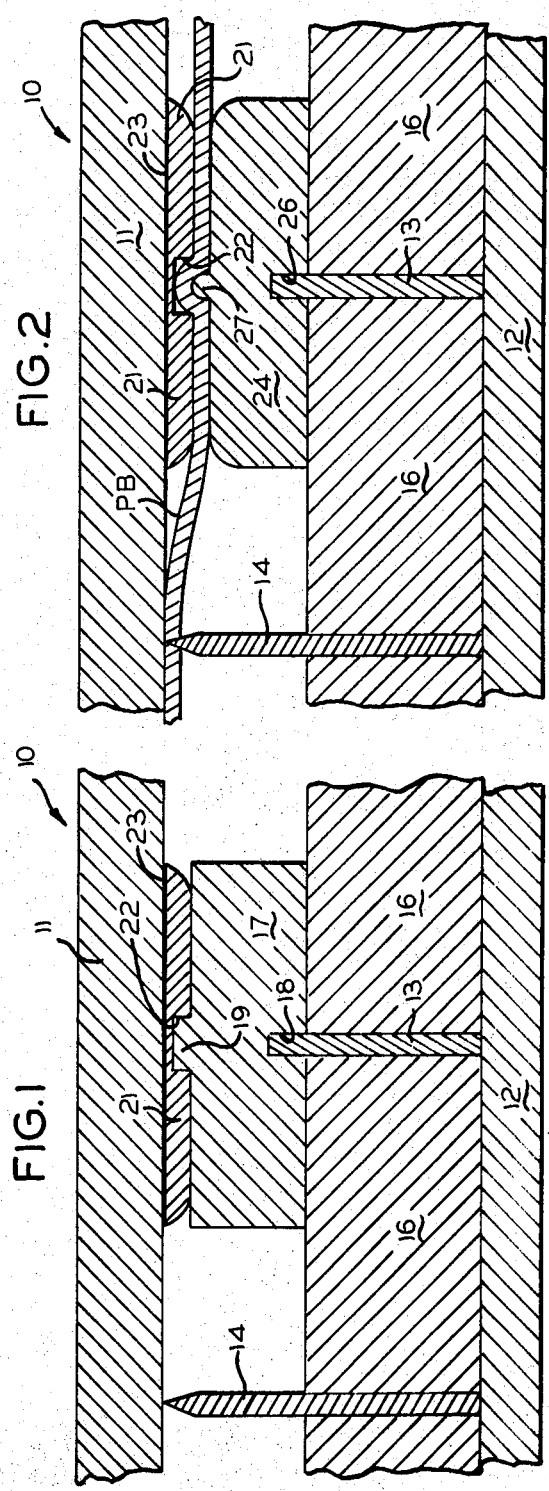
FIG.2
FIG.1
INVENTOR
BY Carpenter, Ostie & Lindberg
ATTORNEYS

METHOD AND APPARATUS FOR PREPARING SCORING DIES

The Prior Art: Tross 3,113,898 illustrates a method of locating the scoring elements of a scoring die, but it is lacking in the concept of using a standard rule in connection with a male-female member whose dimensions may be varied according to the caliper of board employed and according to the width of the slot in the female scoring element. Tross is also lacking in the concept of employing a replaceable locating element cooperating with a standard size rule and arranged to cooperate with the female scoring element to locate the same on the cylinder supporting same.

SUMMARY OF THE INVENTION

By reason of the construction herein disclosed it is necessary to employ but one size of rule in the chase, and to employ such rule with a locating element to locate the female scoring element on the supporting cylinder, the same rule thereafter cooperating with a male-female scoring element also cooperating with the female scoring element.

THE DRAWING

FIG. 1 is a sectional view through a flat bed and rotatable cylinder having the elements according to the present invention in position for properly locating a female scoring element on the rotatable cylinder;

FIG. 2 is a view similar to FIG. 1, but showing a male-female locating member replaced by a second male-female member cooperating with the female scoring element, paperboard adapted to be acted thereon being shown therebetween; and FIG. 3 is a graph showing the desirable relationship between the width of the groove in the female scoring member and the caliper of paperboard.

Referring now to FIG. 1, the elements and apparatus for carrying on the present invention are referred to generally by the reference numeral 10 and are shown in the environment of an element of a rotary cylinder 11 and bed 12 of a flat bed press.

A standard size rule 13 extends upward from a chase, not shown, secured to the bed 12. Blocks 16 lock rule 13 in position as well as a cutting rule 14. The exposed part of rule 13 cooperates with a male-female member 17 having a vertical slot 18 in the bottom face thereof, rule 13 extending thereinto, member 17 resting upon the surface of blocks 16.

The upper face of member 17 has a locating land 19 thereon, it extending into a groove 22 of a female scoring element 21. The latter is held by a suitable adhesive 23 to the curved surface of rotary cylinder 11. Scoring element 21 is made of a suitably compliant metal such as brass or aluminum so as to enable the same to be wrapped about the cylinder 11.

When female scoring element 21 is located on cylinder 11 in the manner described, bed 12 is moved relative to cylinder 11 to free male-female member 17 from scoring element 21. The former is then discarded and a second male-female member 24 (see FIG. 2) inserted into position as aforesaid in lieu thereof. Member 24 has a vertical slot 26 in the bottom face thereof into which rule 13 extends. Member 24 also has a land or bead 27 extending upward therefrom of substantially semicircular cross section.

Bead 27 is aligned with groove 22, a thickness of paperboard PB extending between female scoring element 21 and bead 27 to place a proper fold line or crease therein. Member 24 has not the height of member 17, and the thickness of paperboard PB can be accommodated without disturbing the relative position of rotary cylinder 11 and bed 12.

Referring now to FIG. 3, there is shown a chart illustrating the desirable relationship between the width of the groove or crease 22 and the paperboard caliper both stated in inches. For a given caliper the desirable groove width is from 3 to 4 times as great. Accordingly for a paperboard PB of a given caliper there is selected a scoring element 21 having a groove within the stated parameters, generally. The selection of a proper land or bead 27 on the second male-female member 24 is one resulting from experience with paperboard of different varieties and caliper.

I claim:

1. In a method of assembling scoring elements in apparatus for the production of paperboard carton blanks, said apparatus comprising a movable flat bed and a rotatable cylinder, said method comprising the steps of:
    a. assembling a rule into a chase mounted on said flat bed;
    b. mounting a male-female locating member in releasable locking engagement with said rule;
    c. mounting a female scoring element having a groove on said male-female member in releasable engagement therewith;
    d. adhering said female scoring element to said rotatable cylinder while still in engagement with said male-female locating member;
    e. removing said male-female member from said rule;
    f. replacing said locating member with a male-female scoring member selected responsive to the caliper of paperboard and having its female portion in engagement with said rule for cooperation with the groove of said female scoring element.

2. Elements for use in the preparation and positioning of scoring die of a flat bed and rotatable cylinder for the production of paperboard carton blanks, comprising:
    a. a chase mounted on said flat bed;
    b. a rule locked in said chase and extending therefrom;
    c. a male-female locating member positioned in releasable locking engagement with said rule;
    d. a female scoring element mounted releasably on said male-female locating member and adapted to be secured to said rotatable cylinder in properly oriented position by said male-female locating member; e. a male-female scoring member selected responsive to the caliper of paperboard and adapted to replace said male-female locating member after said female scoring element is secured to said rotatable cylinder and to be in engagement with said rule for defining with said female scoring element cooperating scoring elements for said paperboard blank.

3. Elements according to claim 2 wherein said male-female scoring member has a land thereon entrant into said female scoring element.

4. Elements according to claim 3 wherein said male-female scoring member is selected according to the size of said land.

* * * * *

UNITED STATES PATENT OFFICE
CERTIFICATE OF CORRECTION

Patent No. 3,619,318         Dated November 9, 1971

Inventor(s) Richard S. Shultz

It is certified that error appears in the above-identified patent and that said Letters Patent are hereby corrected as shown below:

On the cover sheet [54] "13 Drawing Figs." should read -- 3 Drawings Figs. -- .

Signed and sealed this 14th day of November 1972.

(SEAL)
Attest:

EDWARD M. FLETCHER, JR.             ROBERT GOTTSCHALK
Attesting Officer                   Commissioner of Patents